US012687334B2

(12) United States Patent
Moon et al.

(10) Patent No.: US 12,687,334 B2
(45) Date of Patent: Jul. 21, 2026

(54) WATER PURIFIER

(71) Applicant: COWAY Co., Ltd., Gongju-si (KR)

(72) Inventors: Hyoungmin Moon, Seoul (KR); Sung Han Yun, Seoul (KR); Gukwon Lee, Seoul (KR); Sung Kon Cho, Seoul (KR)

(73) Assignee: COWAY Co., Ltd., Gongju-si (KR)

( * ) Notice: Subject to any disclaimer, the term of this patent is extended or adjusted under 35 U.S.C. 154(b) by 777 days.

(21) Appl. No.: 18/154,260

(22) Filed: Jan. 13, 2023

(65) Prior Publication Data

US 2023/0228473 A1 Jul. 20, 2023

(30) Foreign Application Priority Data

Jan. 17, 2022 (KR) .......................... 10-2022-0006567

(51) Int. Cl.
*C02F 1/00* (2023.01)
*C02F 1/44* (2023.01)
(Continued)

(52) U.S. Cl.
CPC ................ *F25C 1/25* (2018.01); *C02F 1/003* (2013.01); *C02F 1/441* (2013.01); *F25D 23/00* (2013.01); *C02F 2201/004* (2013.01); *C02F 2201/005* (2013.01); *C02F 2201/007* (2013.01); *C02F 2209/40* (2013.01); *C02F 2301/04* (2013.01);
(Continued)

(58) Field of Classification Search
CPC ............................ C02F 1/003; F25D 2323/121
See application file for complete search history.

(56) References Cited

U.S. PATENT DOCUMENTS

2018/0370831 A1 * 12/2018 Moon .................... B01D 35/06

FOREIGN PATENT DOCUMENTS

JP           H10219764 A   *   8/1998   ............. E03B 11/00
KR    10-2013-0046099 A       5/2013
(Continued)

OTHER PUBLICATIONS

Nogami et al.—H10219764A machine translation—Aug. 18, 1998 (Year: 1998).*

(Continued)

*Primary Examiner* — Bradley R Spies
(74) *Attorney, Agent, or Firm* — Oblon, McClelland, Maier & Neustadt, L.L.P.

(57) ABSTRACT

A water purifier includes a water purification unit, and an ice making unit. The water purification unit includes: a water filter for filtering introduced raw water to provide the purified water and unfiltered living water; a purified water tank including a first storage for storing unfiltered water, a second storage for storing the purified water discharged from the water filter, and a separation membrane formed of an impermeable material which independently partitions the first storage and the second storage and has elasticity, wherein the second storage shrinks when the first storage expands, and the first storage shrinks when the second storage expands; a flow channel connecting the water filter, the purified water tank, and the ice making unit to provide a passage through which the raw water, the living water, and the purified water flow; and a valve unit including a plurality of valve modules.

5 Claims, 4 Drawing Sheets

(51) Int. Cl.
  F25C 1/25          (2018.01)
  F25D 23/00          (2006.01)
(52) U.S. Cl.
  CPC ...... *C02F 2307/12* (2013.01); *F25C 2400/14*
        (2013.01); *F25C 2600/04* (2013.01); *F25D*
                  *2323/121* (2013.01)

(56)               References Cited

FOREIGN PATENT DOCUMENTS

KR        20190019714 A  *  2/2019  ............... B67D 1/12
WO     WO-2014058724 A1 *  4/2014  ............. B01D 61/10

OTHER PUBLICATIONS

Choi et al.—KR 20190019714A machine translation—Feb. 27,
2019 (Year: 2019).*

* cited by examiner

WATER PURIFIER

TECHNICAL FIELD

The present disclosure relates to a water purifier.

BACKGROUND

In general, a water purifier is a device that receives raw water from a raw water source such as tap water, filters the raw water into purified water through a filter provided therein, and then provides the purified water to a user. Such a water purifier may include a water filter that filters raw water to provide purified water, a purified water storage that stores the purified water, and an ice making unit that cools the purified water to provide ice.

However, in a conventional water purifier, in order to introduce purified water discharged from a water filter or purified water discharged from a purified water tank into an ice making unit, the ice making unit needs to be disposed below the water filter or the purified water tank. In addition, the conventional water purifier has a problem in that when the ice-making unit is disposed above the purified water tank or the water filter, a motor or pump for pressurizing purified water to flow into the ice making unit is required. In other words, when the ice making unit is provided in the conventional water purifier, the design of the water purifier has limitations.

In this regard, Korean Patent Application Publication No. 10-2013-0046099 "Ice water purifier" (Patent Document 1) of Korea Nakajo Co., Ltd. discloses an ice water purifier including a filter unit for providing purified water, a purified water tank for storing purified water, and an ice making unit for providing ice by cooling the purified water.

However, the ice making unit of the ice water purifier of Patent Document 1 has a problem in that the ice making unit needs to be disposed below the purified water storage (purified water tank) in order to receive purified water from the purified water storage. In other words, since the ice making unit of Patent Document 1 cannot be disposed above the purified water storage, the design of the water purifier has limitations. In addition, the ice water purifier of Patent Document 1 has a problem in that a booster pump is further required to flow the purified water discharged from the filter unit to the purified water storage and the ice making unit disposed above the filter unit. In other words, in Patent Document 1, whenever purified water is discharged from the filter unit, the booster pump may generate noise.

PRIOR ART DOCUMENT (Patent Document 1) Korean Patent Application Publication No. 10-2013-0046099 (published on May 7, 2013)

SUMMARY

In view of the above, one embodiment of the present disclosure provides a water purifier in which the position of an ice making unit is not limited by the position of a storage for storing purified water in a purified water tank.

In addition, one embodiment of the present disclosure provides a water purifier in which the water purification unit can be disposed above the purified water tank.

Further, one embodiment of the present disclosure provides a water purifier requiring no motor or pump to pressurize purified water to flow to the ice making unit.

In accordance with an embodiment of the present disclosure, there is provided a water purifier including: a water purification unit configured to provide purified water; and an ice making unit configured to cool the purified water to generate ice, wherein the water purification unit includes: a water filter for filtering introduced raw water to provide the purified water and unfiltered living water; a purified water tank including a first storage for storing unfiltered water that has not been filtered by the water filter, a second storage for storing the purified water discharged from the water filter, and a separation membrane formed of an impermeable material which independently partitions the first storage and the second storage and has elasticity, wherein the second storage shrinks when the first storage expands, and the first storage shrinks when the second storage expands; a flow channel connecting the water filter, the purified water tank, and the ice making unit to provide a passage through which the raw water, the living water, and the purified water flow; and a valve unit including a plurality of valve modules that are selectively opened and closed to control the flow of the raw water, the living water, and the purified water in the flow channel, wherein the plurality of valve modules are opened and closed based on a plurality of flow modes, wherein the plurality of flow modes include an ice making mode in which the purified water flows to the ice making unit, wherein the plurality of valve modules are opened and closed so that in the ice making mode, the unfiltered water flows into the first storage and the purified water discharged from the second storage shrunk by the first storage flows into the ice making unit, and wherein the ice making unit is disposed above the purified water tank or disposed horizontally with the purified water tank.

The purified water tank may be formed in an airtight type to prevent outside air from being introduced therein.

The plurality of flow modes may further include a purified water discharge mode in which the purified water is discharged to the outside, the water purification unit may further include a discharge part through which the purified water is discharged to the outside, the plurality of valve modules may be opened and closed so that in the purified water discharge mode, the unfiltered water may flow into the first storage and the purified water discharged from the second storage shrunk by the first storage may flow into the discharge part, and the discharge part may be disposed above the purified water tank.

The plurality of flow modes may further include a purified water storage mode in which the purified water is stored in the second storage, the unfiltered water may include the living water, the flow channel may include: a purified water flow path connected to the second storage and providing a passage through which the purified water flows; and a living water flow path connected to the first storage and providing a passage through which the living water flows, the plurality of flow modes may further include a purified water discharge mode in which the purified water is discharged to the outside, and the plurality of valve modules are opened and closed so that in the purified water storage mode, the purified water discharged from the water filter flows into the second storage through the purified water flow path, and the living water discharged from the first storage shrunk by the second storage is discharged to the outside through the living water flow path.

At least one of the plurality of valve modules may have a plurality of openings, and may include a mechanical valve module configured to open and close the plurality of openings by pressure of the raw water, the purified water, or the living water, or an electronic valve module configured to open and close the plurality of openings by an electronic motor.

According to one embodiment of the present disclosure, since purified water can flow to the ice making unit when the second storage is shrunk, the ice making unit can be disposed regardless of the position of the purified water tank.

In addition, since the water purification unit can be disposed above the purified water tank, the water purification unit can be formed in an airtight type to prevent contamination of the purified water and it is possible to perform maintenance of the water purification unit without interfering with the purified water tank.

Moreover, since the purified water can flow to the ice making unit as the storage for storing purified water is shrunk without a separate pump or motor, noise caused by the pump or motor can be reduced.

DETAILED DESCRIPTION

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, or 'flowed' into another element, it should be understood that the element may be directly connected to, or flowed into another element, but that other elements may exist in the middle.

The terms used in the present disclosure are only used for describing specific embodiments, and are not intended to limit the present disclosure. Singular expressions include plural expressions unless the context clearly indicates otherwise.

Further, in the present disclosure, it is to be noted that expressions, such as the upper side and the lower side, are described based on the illustration of drawings, but may be modified if directions of corresponding objects are changed. For the same reasons, some components are exaggerated, omitted, or schematically illustrated in the accompanying drawings, and the size of each component does not fully reflect the actual size.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

Hereinafter, a water purifier 1 according to one embodiment of the present disclosure will be described with reference to the drawings.

Figure 1:
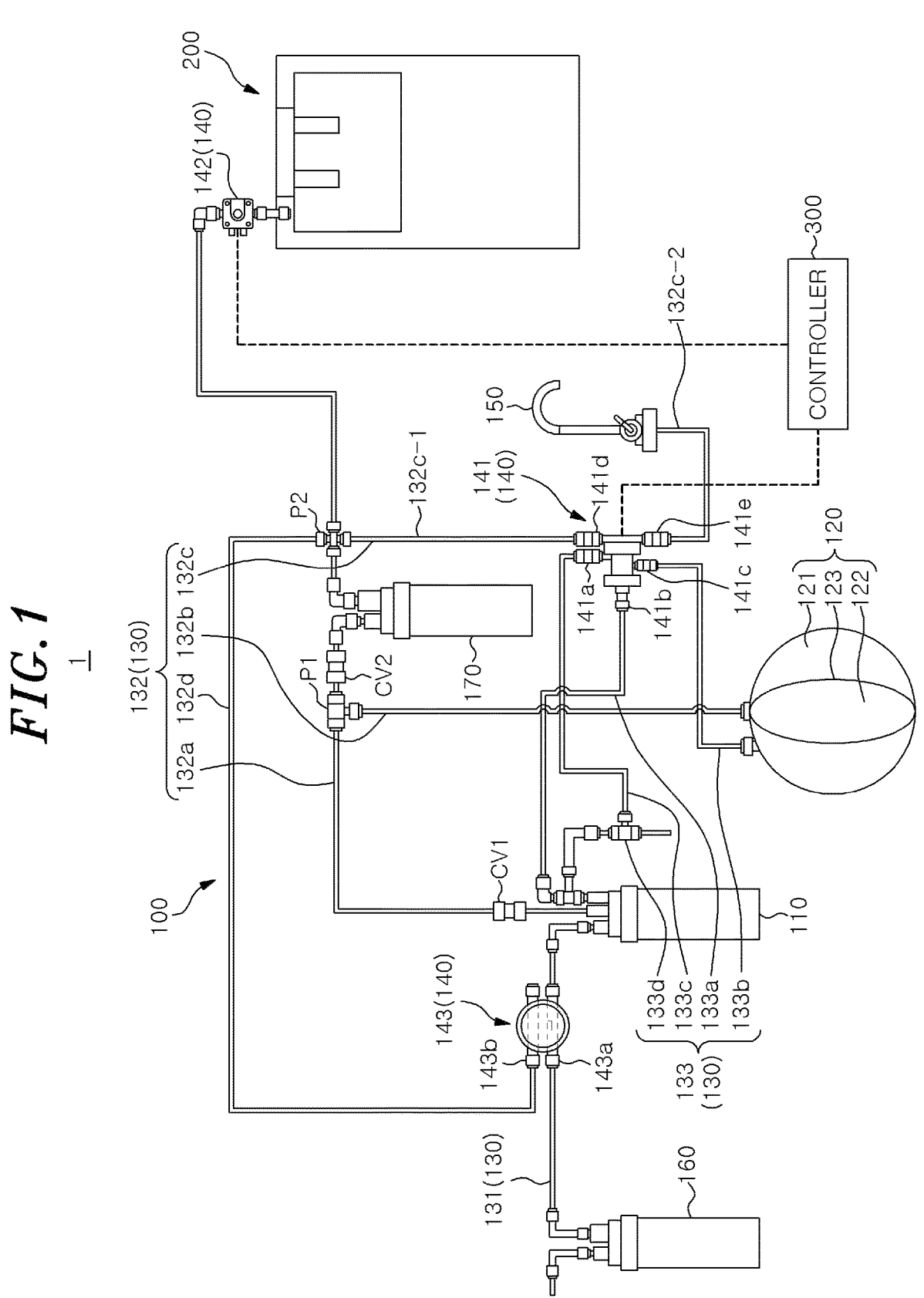
FIG. 1 is a diagram showing a water purifier according to one embodiment of the present disclosure.

Referring to FIG. 1, the water purifier 1 according to one embodiment of the present disclosure can provide clean water to a user by filtering water supplied from the outside. For example, the water purifier 1 may receive water from a water supply source (not shown) such as tap water, and may filter the supplied water into clean water. The water purifier 1 may include a water purification unit 100, an ice making unit 200 and a controller 300.

The water purification unit 100 may be configured to provide purified water by filtering water. The water purification unit 100 may include a water filter 110, a purified water tank 120, a flow channel 130, a valve unit 140, a discharge part 150, a pre-treatment filter 160, a post-treatment filter 170, and a shut-off valve 180.

The water filter 110 may filter at least a part of introduced raw water to provide purified water. In a case where the water filter 110 is configured to filter a part of the introduced raw water, the remaining unfiltered water may be provided as living water. For example, the water filter 110 may be a reverse osmosis filter. In this specification, raw water is defined as water before being filtered in the water filter 110 regardless of being filtered through the pre-treatment filter 170 and purified water is defined as water filtered through the water filter 110 regardless of being filtered through the post-treatment filter 170. In addition, unfiltered water is defined as water containing at least one of living water that has not been filtered by the water filter 110 and raw water.

The purified water tank 120 may be configured to store at least one of raw water and purified water and to discharge one of the raw water and the purified water. In addition, the purified water tank 120 may include a housing (non-flexible housing) that is formed in an airtight type to prevent outside air from flowing in and has no flexibility. The purified water tank 120 may include a first storage 121, a second storage 122 and a separation membrane 123.

The first storage 121 may be configured to store unfiltered water including at least one of living water and raw water discharged from the water filter 110 or to discharge the stored unfiltered water. The first storage 121 may discharge at least one of raw water and living water while shrinking when the second storage 122 expands, and the first storage 121 may expand when at least one of raw water and living water flows therein. When the first storage 121 shrinks, unfiltered water may be discharged to the outside through the flow channel 130. Hereinafter, as one embodiment of the present disclosure, it will be described that living water is stored or discharged in the first storage 121, but the present disclosure is not limited thereto, and unfiltered water including at least one of raw water and living water may be stored in the first storage 121, or discharged from the first storage 121 by expansion of the second storage 122.

The second storage 122 may be configured to store purified water discharged from the water filter 110 or discharge the purified water. The second storage 122 may discharge purified water while shrinking when the first storage 121 expands, and may expand when purified water flows into the second storage 122.

The separation membrane 123 may be formed of an impermeable material to independently partition the first storage 121 and the second storage 122 and may have elasticity. The second storage 122 may shrink when the first storage 121 expands by the separation membrane 123, and the first storage 121 may shrink when the second storage 122 expands. The separation membrane 123 may be accommodated in a non-flexible housing.

The flow channel 130 may provide a passage through which raw water, purified water, and domestic water flow by connecting the water filter 110, the purified water tank 120, and the ice making unit 200. The flow channel 130 may include a raw water flow path 131, a purified water flow path 132, and a living water flow path 133.

The raw water flow path 131 may provide a passage through which raw water introduced from the outside of the water purifier 1 flows. In addition, the raw water flow path 131 may be connected to one or both of the water filter 110 and the first storage 121. Through the raw water flow path 131, raw water may flow into the water filter 110 or may be stored in the second storage 121.

The purified water flow path 132 may provide a passage through which purified water discharged from the water filter 110 flows. Further, the purified water flow path 132 may be connected to one or more of the second storage 122, the discharge part 150, the shut-off valve 180, and the ice making unit 200 so that the purified water is transferred to at least one of the second storage 122, the discharge part 150, the shut-off valve 180, and the ice making unit 200. The purified water flow path 132 may include a purified water transfer passage 132a, a purified water flow passage 132b, a purified water discharge passage 132c, and a purified water extension passage 132d.

The purified water transfer passage 132a may be connected to the water filter 110 to provide a passage through which purified water discharged from the water filter 110 flows. In addition, the purified water transfer passage 132a may be connected to the purified water flow passage 132b, the purified water discharge passage 132c, the purified water extension passage 132d, and the ice making unit 200. Through the purified water transfer passage 132a, the purified water may flow to one or more of the purified water flow passage 132b, the purified water discharge passage 132c, the purified water extension passage 132d, and the ice making unit 200. In addition, a plurality of check valves CV1 and CV2 may be provided in the purified water transfer passage 132a so that the purified water discharged from the water filter 110 flows in a direction away from the water filter 110. For example, a first check valve CV1, which is one of the plurality of check valves CV1 and CV2, may be provided in the purified water transfer passage 132a to be disposed between a point where the purified water transfer passage 132a and the purified water flow passage 132b are joined (hereinafter, referred to as a first point P1) and the water filter 110. Further, a second check valve CV2, which is the other one of the plurality of check valves CV1 and CV2, may be provided in the purified water transfer passage 132a to be disposed between the first point P1 and the post-treatment filter 170. Furthermore, the first check valve CV1 allows purified water to be discharged from the water filter 110 in a purified water storage mode to be described later and prevents purified water from flowing into the water filter 110 even when purified water is discharged from the second storage 122 as in a purified water discharge mode and an ice making mode to be described later. Moreover, the second check valve CV2 prevents the reverse flow of purified water flowing in the purified water transfer passage 132a toward the first point P1. In addition, after the discharge part 150 and an ice maker valve module 142 are switched to a closed state, the second check valve CV2 may serve to keep a pressure in the passage located downstream of the second check valve CV2 in the purified water flow path 132.

The purified water flow passage 132b may provide a passage through which the purified water flowing in the purified water transfer passage 132a flows into the second storage 122, and the purified water discharged from the second storage 122 flows into the purified water transfer passage 132a. In other words, the purified water flowing in the purified water flow passage 132b may flow into the second storage 122 or may flow into the purified water transfer passage 132a. For example, the purified water flow passage 132b may be disposed between the purified water transfer passage 132a and the purified water tank 120.

The purified water discharge passage 132c may provide a passage through which the purified water flowing in the purified water transfer passage 132a flows to the discharge part 150. In other words, the purified water flowing in the purified water discharge passage 132c may flow to the discharge part 150. For example, the purified water discharge passage 132c may be disposed between the purified water transfer passage 132a and the discharge part 150. In addition, a point where the purified water discharge passage 132c and the purified water transfer passage 132a are joined (hereinafter, referred to as a second point P2) may be disposed downstream of the first point P1 based on the direction in which purified water flows in the purified water transfer passage 132a. The purified water discharge passage 132c may include a first discharge passage 132c-1 and a second discharge passage 132c-2.

The first discharge passage 132c-1 may be connected to the purified water transfer passage 132a and a passage switching valve module 141 of the valve unit 140, which will be described later, to transfer the purified water to the passage switching valve module 141.

The second discharge passage 132c-2 may be connected to the discharge part 150 and the passage switching valve module 141 to transfer the purified water passing through the passage switching valve module 141 to the discharge part 150. In other words, the second discharge passage 132c-2 may communicate with the first discharge passage 132c-1 through the passage switching valve module 141.

The purified water extension passage 132d may provide a passage through which the purified water flowing in the purified water transfer passage 132a flows to a shut-off valve module 143 of the valve unit 140 to be described later. In other words, the purified water may flow to the shut-off valve module 143 through the purified water extension passage 132d. In addition, the purified water extension passage 132d may be joined to the second point P2 of the purified water transfer passage 132a, but the present disclosure is not limited thereto.

The living water flow path 133 may provide a passage through which the living water discharged from the water filter 110 flows. The living water flow path 133 may be connected to the passage switching valve module 141 and the first storage 121 to transfer the living water to the passage switching valve module 141 and the first storage 121. In addition, the living water flow path 133 may be configured to discharge the living water to the outside. The living water flow path 133 may include a living water transfer passage 133a, a living water flow passage 133b, a living water connection passage 133c, and a living water discharge passage 133d.

The living water transfer passage 133a may be connected to the water filter 110 to provide a passage through which the living water discharged from the water filter 110 flows. In addition, the living water flow path 133 may selectively communicate with the living water flow passage 133*b* through the flow path switching valve module 141 to transfer the living water to the living water flow passage 133*b*.

The living water flow passage 133*b* may provide a passage through which the living water flows into the first storage 121 and the living water discharged from the first storage 121 flows. In addition, the living water flow path 133 may selectively communicate with any one of the living water transfer passage 133*a* and the living water connection passage 133*c* through the passage switching valve module 141. When the living water flow passage 133*b* and the living water transfer passage 133*a* communicate with each other, the living water may flow toward the first storage 121 to be stored in the first storage 121. In addition, when the living water flow passage 133*b* and the living water connection passage 133*c* communicate with each other, the living water discharged from the first storage 121 may flow into the living water connection passage 133*c*.

The living water connection passage 133*c* may provide a passage through which the living water flows to the living water discharge passage 133*d*. The living water connection passage 133*c* may selectively communicate with the living water flow passage 133*b* through the passage switching valve module 141 to transfer the living water flowing in the living water flow passage 133*b* to the living water discharge passage 133*d*.

The living water discharge passage 133*d* may provide a passage through which the living water is discharged to the outside of the water purifier 1. The living water discharge passage 133*d* may be connected to the water filter 110 and the living water connection passage 133*c* to discharge the living water discharged from the water filter 110 and the living water flowing in the living water connection passage 133*c* to the outside.

The valve unit 140 may include a plurality of valve modules that are selectively opened and closed to control the flow of raw water, living water, and purified water in the flow channel 130 based on a plurality of flow modes. Through the plurality of valve modules, raw water may flow into the water filter 110, and purified water may flow into one or more of the second storage 122, the ice making unit 200, and the discharge part 150. The living water may flow into the first storage 121 or may be discharged to the outside. In addition, at least one of the plurality of valve modules has a plurality of openings, and the plurality of valve modules may include a mechanical valve module configured to open and close the plurality of openings by the pressure of raw water or living water, or may include an electronic valve module opened and closed by an electronic motor controlled by the controller 300. The valve unit 140 may include a flow path switching valve module 141, an ice maker valve module 142 and a shut-off valve module 143.

The flow path switching valve module 141 may be selectively opened and closed to control the flow of living water, raw water or purified water. The flow path switching valve module 141 may switch a flow path formed therein so that purified water flows into the second storage 122 or purified water is discharged from the second storage 122. In addition, the flow path switching valve module 141 may be formed as a mechanical valve or an electronic valve.

When the flow path switching valve module 141 is formed as the mechanical valve, the flow path can be switched by the pressure of any one of purified water, living water, and raw water. In other words, the mechanical flow path switching valve module 141 is not operated by the controller 300 and can change the flow path by the pressure of raw water, purified water, or living water. When a pressure in the first discharge passage 132*c*-1 is lower than a previously set pressure (for example, a value selected from 20 to 40% of a water pressure of raw water), the mechanical flow path switching valve module 141 may switch the flow path so that purified water flows from the second storage 122 to one or both of the discharge part 150 and the ice making unit 200. In addition, the mechanical flow path switching valve module 141 may switch the flow path so that purified water is stored in the second storage 122 when the pressure in the first discharge path 132*c*-1 is higher than the set pressure.

As another example, when the flow path switching valve module 141 is formed as the electronic valve, the flow path may be switched under the control of the controller 300.

In addition, a first opening 141*a*, a second opening 141*b*, a third opening 141*c*, a fourth opening 141*d*, and a fifth opening 141*e* that are selectively opened and closed may be formed in the flow path switching valve module 141.

The first opening 141*a* may communicate with the living water connection passage 133*c*. The second opening 141*b* may communicate with the living water transfer passage 133*a*. The third opening 141*c* may communicate with the living water flow passage 133*b*. The fourth opening 141*d* may communicate with the first discharge passage 132*c*-1. Further, the fifth opening 141*e* may communicate with the second discharge passage 132*c*-2.

The flow path switching valve module 141 may switch the flow path to open a flow path through which the third opening 141*c* and the first opening 141*a* communicate with each other or to open a flow path through which the second opening 141*b* and the third opening 141*c* communicate with each other. In other words, when the third opening 141*c* and the first opening 141*a* communicate with each other through the flow path switching valve module 141, the living water discharged from the first storage 121 is discharged through the living water discharge passage 133*d*. Alternatively, when the second opening 141*b* and the third opening 141*c* communicate with each other through the flow path switching valve module 141, the living water discharged from the water filter 110 may flow into the first storage 121.

In addition, the flow path switching valve module 141 may have a flow path through which the fourth opening 141*d* and the fifth opening 141*e* communicate with each other. The fourth opening 141*d* and the fifth opening 141*e* may be configured to be always open.

When the third opening 141*c* and the first opening 141*a* communicate with each other by switching the flow path of the flow path switching valve module 141, the third opening 141*c* and the first opening 141*a* are opened, and the second opening 141*c* is closed, so that the living water connection passage 133*c* and the living water flow passage 133*b* can communicate with each other.

In addition, when the third opening 141*c* and the first opening 141*a* communicate with each other, the discharge part 150 is in a closed state, and purified water filtered by the water filter 110 can flow into the second storage 122 through the purified water transfer passage 132*a* and the purified water flow passage 132*b*. As the purified water flows into the second storage 122, the living water can be discharged from the first storage 121 and discharged to the outside through the living water flow passage 133*b* and the living water connection passage 133*c*.

When the second opening 141*b* and the third opening 141*c* communicate with each other by switching the flow path of the flow path switching valve module 141, the second opening 141*b* and the third opening 141*c* are opened, and the first opening 141*a* is closed, so that the living water transfer passage 133a and the living water flow passage 133b can communicate with each other.

In addition, when the second opening 141b and the third opening 141c communicate with each other, one of the discharge part 150 and the ice maker valve module 142 is in an open state, and the living water discharged from the water filter 110 can flow into the first storage 121 through the living water transfer passage 133a and the living water flow passage 133b. As the living water flows into the first storage 121, the purified water can be discharged from the second storage 122 and provided to the user through the purified water flow passage 132b, the purified water discharge passage 132c, and the discharge part 150, or provided to the ice making unit 200 through the purified water flow passage 132b.

The ice maker valve module 142 may be selectively opened and closed so that the purified water flowing in the purified water flow path 132 flows toward the ice making unit 200. In other words, the purified water may flow into the ice maker unit 200 when the ice maker valve module 142 is opened. The ice maker valve module 142 may be provided on the purified water transfer passage 132a and may be disposed downstream of the second point P2.

The shut-off valve module 143 may block the inflow of raw water when the pressure in the passage connecting the second storage 122 and the discharge part 150 is equal to or higher than the set pressure. The shut-off valve module 143 may be connected to the raw water flow path 131 and the purified water extension passage 132d. The shut-off valve module 143 may include a first flow path 143a and a second flow path 143b.

The first flow path 143a may be connected to the raw water flow path 131. The first flow path 143a may open and close the raw water flow path 131 based on the pressure of the second flow path 143b.

The second flow path 143b may be connected to the purified water extension passage 132d to receive pressure of the purified water discharge passage 132c. In other words, in the second flow path 143b, the purified water is supplied to the second storage 122 in a state where the discharge part 150 and the ice maker valve module 142 are closed, and when the purified water is filled up in the second storage 122, the pressure in the purified water discharge passage 132c is gradually increased by the pressure of the raw water. When the pressure in the purified water discharge passage 132c increases, the second flow path 143b may receive the pressure in the purified water discharge passage 132c through the purified water extension passage 132d. The shut-off valve module 143 may close the first flow path 143a when the pressure applied to the second flow path 143b is equal to or higher than a previously set pressure due to the increase in the pressure in the purified water discharge passage 132c.

For example, the set pressure at which the shut-off valve module 143 operates may be set between 40% and 80% of the raw water pressure, preferably between 50% and 70% of the raw water pressure. In other words, when the pressure inside the second storage 122 is greater than the pressure set between 40% and 80% of the raw water pressure, or when the pressure on the flow path connecting the second storage 122 and the discharge part 150 is greater than the pressure set between 40% and 80% of the raw water pressure, the shut-off valve module 143 may close the first flow path 143a to block the inflow of raw water.

In addition, the shut-off valve module 143 may block the inflow of raw water when the pressure in the second storage 122 exceeds the set pressure. When the second storage 122 is filled with a certain amount of purified water and the volume of the second storage 122 reaches a maximum value or a value close to the maximum value, the pressure in the second storage 122 may increase to a certain pressure or higher. The pressure in the second storage 122 is transferred to the purified water flow passage 132b, the purified water discharge passage 132c, and the purified water extension passage 132d and then transferred to the first flow path 143a, and when the pressure is higher than the set pressure, the first flow path 143a may be closed.

Meanwhile, the plurality of flow modes may include an ice making mode, a purified water discharge mode, and a purified water storage mode.

Figure 2:
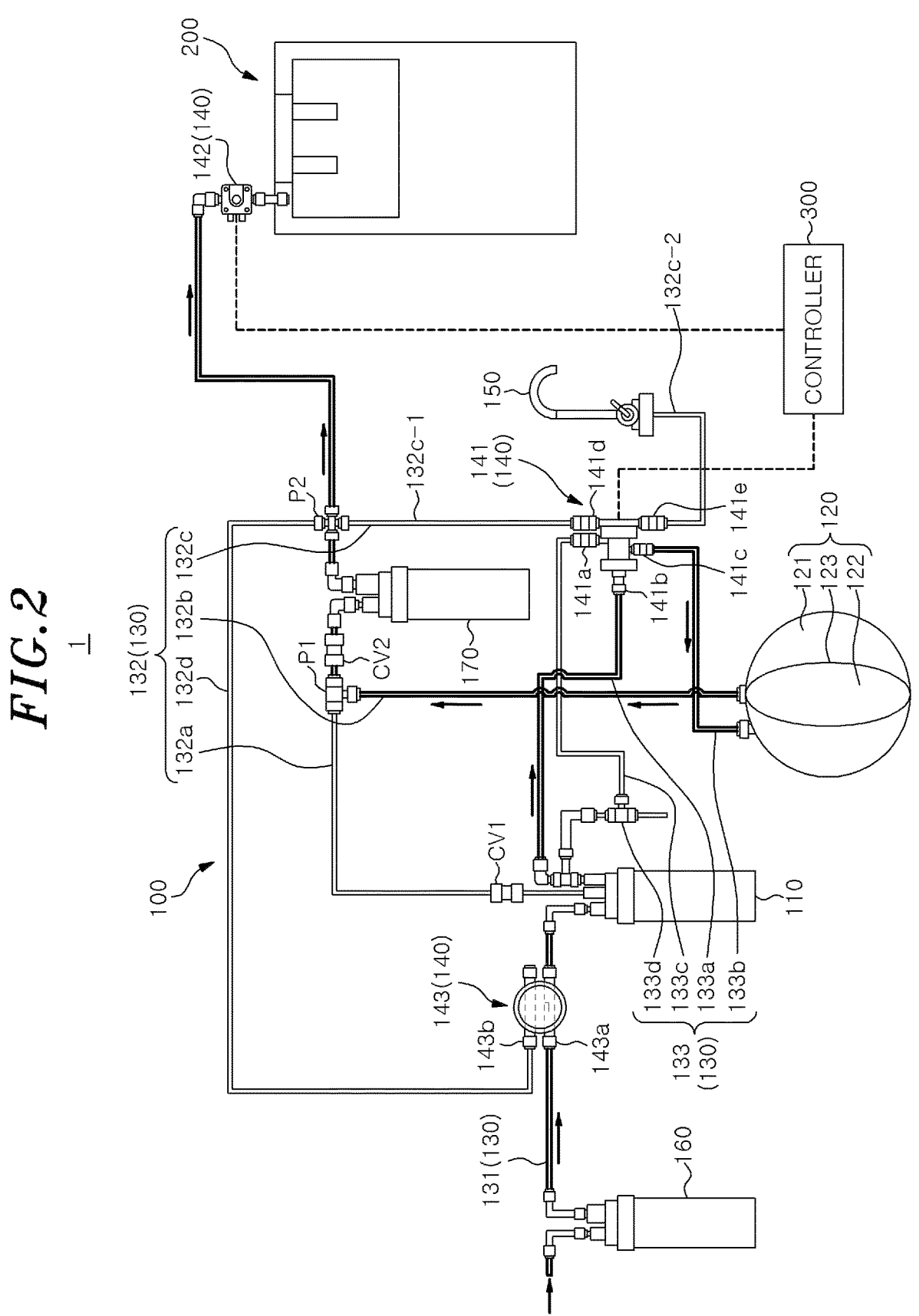
FIG. 2 is a diagram illustrating flow paths of raw water, purified water, and living water in an ice making mode in FIG. 1.

Referring further to FIG. 2, the ice making mode is a mode in which the purified water flows to the ice making unit 200. In the ice making mode, the plurality of valve modules may be opened and closed so that living water flows into the first storage unit 121, and purified water discharged from the second storage 122 shrunk by the first storage 121 flows into the ice making unit 200.

Specifically, in the ice making mode, the ice maker valve module 142 may be opened by the controller 300 so that the purified water flowing in the purified water transfer passage 132a flows to the ice maker unit 200. When the ice maker valve module 142 is opened, the pressure in the purified water transfer passage 132a and the purified water discharge passage 132c may decrease.

In addition, in the ice making mode, when the electronic flow path switching valve module 141 may switch the flow path by the controller 300 so that the living water transfer passage 133a and the living water flow passage 133b communicate with each other. Further, in the ice making mode, the mechanical flow path switching valve module 141 may switch the flow path, by the decrease in pressure in the purified water transfer passage 132a due to the opening of the ice maker valve module 142, so that the living water transfer passage 133a and the living water flow passage 133b communicate with each other.

In addition, in the ice making mode, the first flow path 143a of the shut-off valve module 143 may be opened while the pressure of the purified water transfer passage 132a is reduced.

Further, in the ice making mode, the discharge part 150 may be closed to block the supply of purified water to the user.

By the discharge part 150, the flow path switching valve module 141, the ice maker valve module 142, and the shut-off valve module 143 in the ice making mode, the living water discharged from the water filter 110 may flow into the first storage 121 through the living water transfer passage 133a and the living water flow passage 133b. In addition, in the ice making mode, even without pressing force by a separate motor, the purified water can be pressurized by the shrunk second storage 122 and flow into the ice making unit 200 through the purified water flow passage 132b and the purified water transfer passage 132a.

Figure 3:
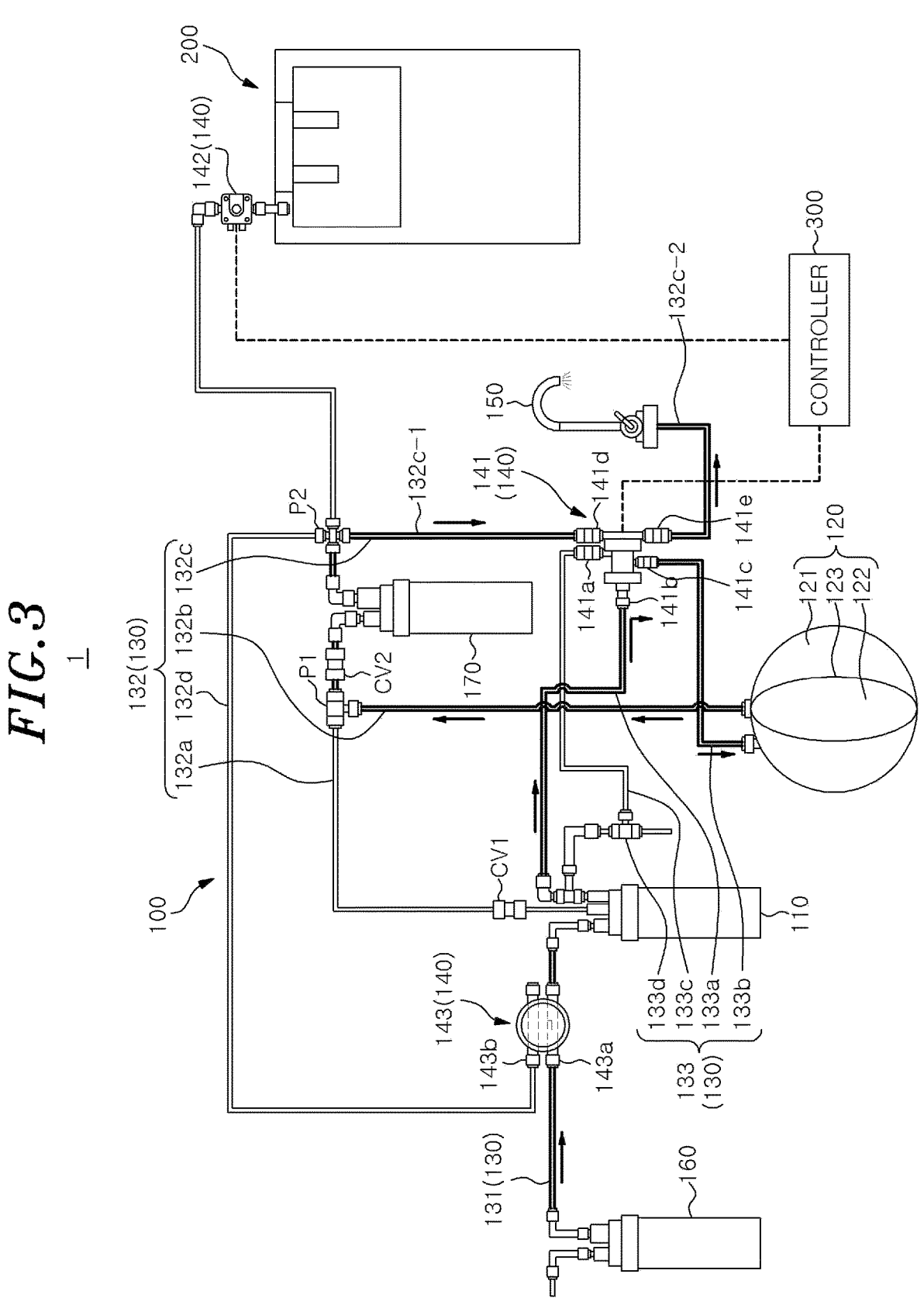
FIG. 3 is a diagram showing flow paths of raw water, purified water, and living water in a purified water discharge mode in FIG. 1.

Referring further to FIG. 3, the purified water discharge mode is a mode in which purified water is discharged to the outside by flowing the purified water into the discharge part 150. For example, the purified water discharge mode may be performed when the discharge part 150 is opened. In the purified water discharge mode, the plurality of valve modules may be opened and closed so that living water flows into the first storage 121, and purified water discharged from the second storage 122 shrunk by the first storage 121 flows to the discharge part 150.

Specifically, when the discharge part 150 is opened, the pressure in the purified water transfer passage 132a and the purified water discharge passage 132c may decrease.

In addition, in the purified water discharge mode, the electronic flow path switching valve module 141 may switch the flow path by the controller 300 so that the living water transfer passage 133a and the living water flow passage 133b communicate with each other. Further, in the purified water discharge mode, the mechanical flow path switching valve module 141 may switch the flow path, by the decrease in pressure in the living water transfer passage 133a and the purified water discharge passage 132c are reduced, so that the living water transfer passage 133a and the living water flow passage 133b communicate with each other.

In addition, in the purified water discharge mode, the first flow path 143a of the shut-off valve module 143 may be opened by the decrease in pressure in the purified water transfer passage 132a and the purified water discharge passage 132c.

Further, the ice maker valve module 142 may be closed to block the flow of purified water to the ice making unit 200.

By the discharge part 150, the flow path conversion valve module 141, the ice maker valve module 142, and the shut-off valve module 143, in the purified water discharge mode, the living water discharged from the water filter 110 may flow into the first storage 121 through the living water transfer passage 133a and the living water flow passage 133b. In addition, in the purified water discharge mode, even without pressing force by a separate motor, the purified water can be pressurized by the shrunk second storage 122 to be provided to the user through the purified water flow passage 132b, the purified water transfer passage 132a, the purified water discharge passage 132c and the discharge part 150.

Figure 4:
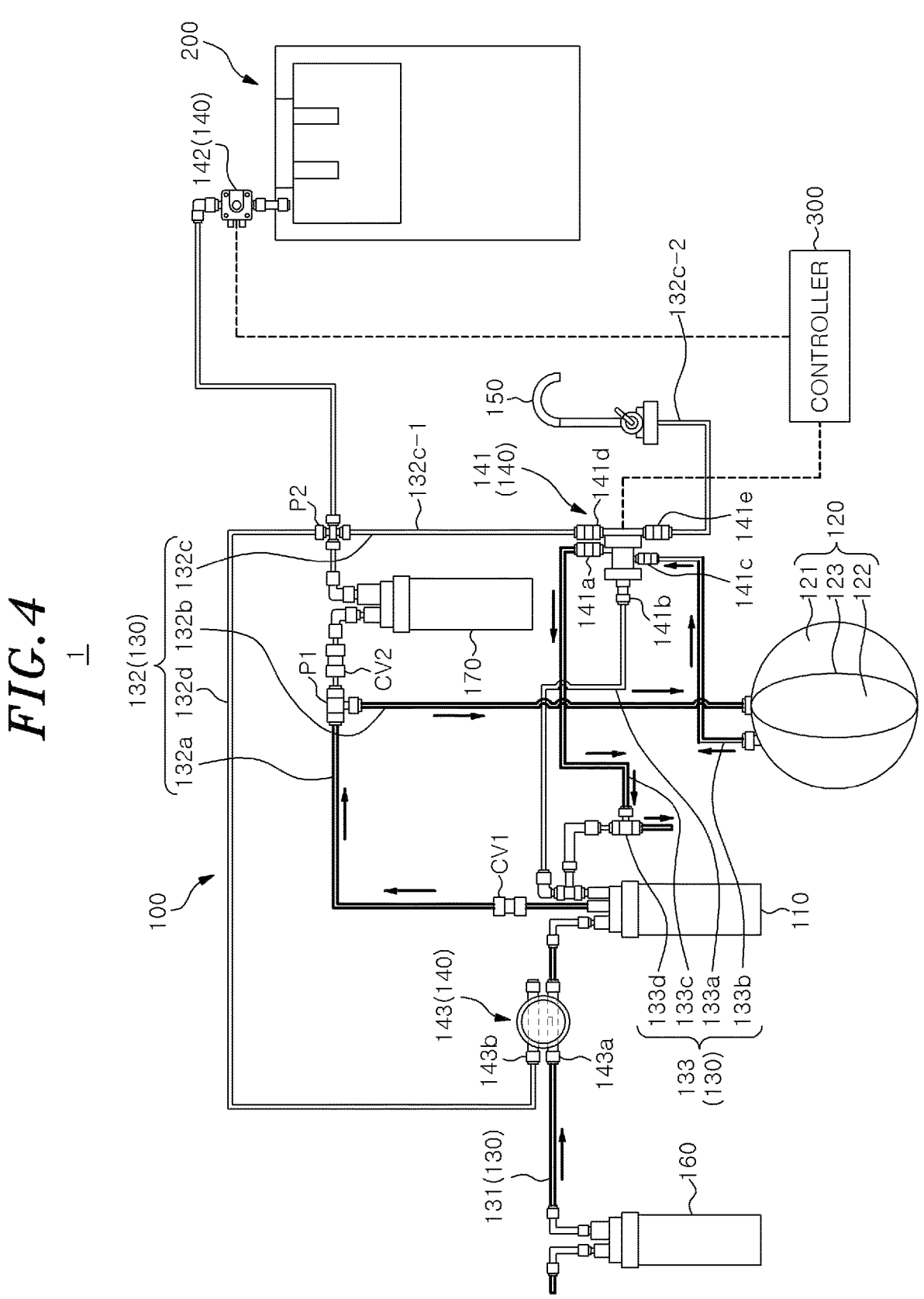
FIG. 4 is a diagram illustrating flow paths of raw water, purified water, and living water in a purified water storage mode in FIG. 1.

Referring further to FIG. 4, the purified water storage mode is a mode in which purified water is stored in the second storage 122. In addition, the purified water storage mode may be performed after the purified water discharge mode or the ice making mode.

In the purified water storage mode, the plurality of valve modules may be opened and closed so that the purified water discharged from the water filter 110 flows into the second storage 122 through the purified water flow path 132, and the living water discharged from the first storage 121 shrunk by the second storage 122 is discharged through the living water flow path 133.

Specifically, the discharge part 150 and the ice maker valve module 142 may be closed in the purified water storage mode. When the discharge part 150 and the ice maker valve module 142 are closed, the pressure in the first discharge passage 132c-1 may increase and become higher than the set pressure.

In addition, in the purified water storage mode, the electronic flow path switching valve module 141 may be controlled by the controller 300 to switch the flow path so that the living water connection passage 133c and the living water flow passage 133b communicate with each other. In the purified water storage mode, the mechanical flow path switching valve module 141 may switch the flow path by the increased pressure in the first discharge passage 132c-1 so that the living water connection flow passage 133c and the living water flow passage 133b communicate with each other.

The first flow path 143a of the shut-off valve module 143 may be opened to allow the inflow of raw water when the pressure in the second storage 122 is equal to or less than the set pressure. In addition, the shut-off valve module 143 is closed when the purified water is continuously stored and the pressure in the second storage 122 is greater than the set pressure, thereby ending the purified water storage mode.

In the purified water storage mode, since the discharge part 150 and the ice maker valve module 142 are closed, the purified water may flow through the purified water transfer passage 132a and the purified water flow passage 132b to be stored in the second storage 122. In addition, in the purified water storage mode, the living water may be discharged to the outside through the living water flow passage 133b, the living water connection passage 133c, and the living water discharge passage 133d by the shrunk first storage 121 even without the pressing force of a separate motor.

The discharge part 150 may discharge purified water to provide the purified water to the user. The discharge part 150 may be connected to the purified water discharge passage 132c to discharge the purified water flowing in the purified water discharge passage 132c to the outside. The discharge part 150 may be configured to be selectively opened and closed by the user. For example, the discharge part 150 may be a faucet disposed in a sink. In addition, the discharge part 150 may be disposed above the purified water tank 120.

The pre-treatment filter 160 may filter raw water flowing into the water purifier 1 before flowing into the water filter 110. In other words, the pre-treatment filter 160 may pre-treat raw water supplied to the water filter 110. The pre-treatment filter 160 may be provided in the raw water flow path 131. For example, the pre-treatment filter 160 may be disposed in the raw water flow path 131 so as to be disposed upstream of the shut-off valve module 143 in the flowing direction of raw water in the raw water flow path 131.

The post-treatment filter 170 may filter the purified water filtered by the water filter 110 again before discharging the purified water from the water purification unit 100. In other words, the post-treatment filter 170 may post-treat the purified water discharged from the water filter 110. The post-treatment filter 170 may be provided in the purified water transfer passage 132a. For example, the post-treatment filter 170 may be provided in the purified water transfer passage 132a to be disposed between the first point and the second point.

The ice making unit 200 may generate ice by cooling purified water. The ice making unit 200 may communicate with the purified water transfer passage 132a through the ice maker valve module 142. In other words, when the ice maker valve module 142 is opened, the purified water flowing in the purified water transfer passage 132a may flow into the ice making unit 200. In addition, the ice making unit 200 may be disposed above the purified water tank 120 or horizontally with the purified water tank 120.

The controller 300 may be configured to control the water purification unit 100 and the ice making unit 200. The controller 300 may open or close one or more of the plurality of valve modules based on the plurality of flow modes. Specifically, the controller 800 may open and close the ice maker valve module 142 based on the plurality of flow modes. The controller 800 may open the ice maker valve module 142 in the ice making mode, and close the ice maker valve module 142 in the purified water storage mode or purified water discharge mode.

In addition, when the flow path switching valve module 141 is formed as an electronic valve, the controller 800 may control based on the pressure of the purified water path 132 sensed by a hydraulic pressure sensor (not shown) or a flow rate of the purified water sensed by a flow rate sensor (not shown).

Specifically, in the ice making mode and the purified water discharge mode, since the pressure in one or more of the purified water transfer passage 132*a* and the purified water discharge passage 132*c* sensed by the hydraulic pressure sensor is reduced, the controller 300 may switch the flow path of the flow path switching valve module 141 so that the living water transfer passage 133*a* and the living water flow passage 133*b* communicate with each other based on the pressure sensed by the hydraulic pressure sensor.

In addition, in the purified water storage mode, since the pressure in one or more of the purified water transfer passage 132*a* and the purified water discharge passage 132*c* sensed by the hydraulic pressure sensor is increased, the controller 300 may switch the flow path so that the living water connection passage 133*c* and the living water flow passage 133*b* communicate with each other based on the pressure sensed by the hydraulic pressure sensor.

The controller 300 described above may be implemented by an arithmetic device including a microprocessor, a measuring device such as a sensor, and a memory, and since the implementation method is obvious to those skilled in the art, further detailed description will be omitted.

Hereinafter, the operations and effects of the water purifier 1 according to one embodiment of the present disclosure will be described.

In the ice making mode of the water purifier 1 according to one embodiment of the present disclosure, since the second storage 122 is shrunk to discharge purified water, even when the purified water is not pressurized by a separate motor, the purified water can flow into the ice making unit 200 and the discharge part 150. Accordingly, since a motor for pressurizing purified water may not be disposed inside the water purifier 1, the size of the water purifier 1 can be reduced, and the discharge part 150 and the ice making unit 200 may be disposed above the purified water tank 120 or horizontally with the purified water tank 120. In other words, the discharge part 150 and the ice making unit 200 can be installed at any location desired by the user without being restricted by the location of the water purifier 1 installed.

The purified water tank 120 is formed in an airtight type to prevent contamination of purified water by external substances or the like.

In addition, when the ice making unit 200 is disposed above the purified water tank 120, since the ice making unit 200, unlike the purified water tank 120, may be exposed to the outside and does not interfere with the water purification unit 100, the ice making unit 200 can be managed efficiently during maintenance. In other words, a manager can easily clean and manage the ice making unit 200.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A water purifier comprising:
a water purification unit configured to provide purified water; and
an ice making unit configured to cool the purified water to generate ice,
wherein the water purification unit includes:
a water filter for filtering introduced raw water to provide the purified water and unfiltered living water;
a purified water tank including a first storage for storing unfiltered water that has not been filtered by the water filter, a second storage for storing the purified water discharged from the water filter, and a separation membrane formed of an impermeable material which independently partitions the first storage and the second storage and has elasticity, wherein the second storage shrinks when the first storage expands, and the first storage shrinks when the second storage expands;
a flow channel connecting the water filter, the purified water tank, and the ice making unit to provide a passage through which the raw water, the living water, and the purified water flow; and
a valve unit including a plurality of valve modules that are selectively opened and closed to control the flow of the raw water, the living water, and the purified water in the flow channel,
wherein at least one of the plurality of valve modules has a plurality of openings, and includes a mechanical valve module configured to open and close the plurality of openings by pressure of the raw water, the purified water, or the living water,
wherein the valve unit includes a flow path switching valve module configured to selectively open and close a first opening, a second opening, a third opening, a fourth opening and a fifth opening to control for purified water,
wherein the flow channel includes a plurality of flow paths, each of the plurality of flow paths including a plurality of flow passages, each of the flow passages being communicated with a respective one of the plurality of openings, wherein the plurality of valve modules are opened and closed based on a plurality of flow modes,
wherein the plurality of flow modes include an ice making mode in which the purified water flows to the ice making unit,
wherein the plurality of valve modules are opened and closed so that in the ice making mode, the unfiltered water flows into the first storage and the purified water discharged from the second storage shrunk by the first storage flows into the ice making unit,
wherein in the ice making mode, the second opening and the third opening communicate with each other by switching the flow path of the flow path switching valve module such that a living water transfer passage and a living water flow passage are communicated with each other, and
wherein the ice making unit is disposed above the purified water tank or disposed horizontally with the purified water tank.

2. The water purifier of claim 1, wherein the purified water tank is formed in an airtight type to prevent outside air from being introduced therein.

3. The water purifier of claim 1, wherein the plurality of flow modes further include a purified water discharge mode in which the purified water is discharged to the outside,
wherein the water purification unit further includes a discharge part through which the purified water is discharged to the outside, wherein the plurality of valve modules are opened and closed so that in the purified water discharge mode, the unfiltered water flows into the first storage and the purified water discharged from the second storage shrunk by the first storage flows into the discharge part, and wherein the discharge part is disposed above the purified water tank.

4. The water purifier of claim 1, wherein the plurality of flow modes further include a purified water storage mode in which the purified water is stored in the second storage, wherein the unfiltered water includes the living water, wherein the flow channel includes:

a purified water flow path connected to the second storage and providing a passage through which the purified water flows; and a living water flow path connected to the first storage and providing a passage through which the living water flows, wherein the plurality of flow modes further include a purified water discharge mode in which the purified water is discharged to the outside, and wherein the plurality of valve modules are opened and closed so that in the purified water storage mode, the purified water discharged from the water filter flows into the second storage through the purified water flow path, and the living water discharged from the first storage shrunk by the second storage is discharged to the outside through the living water flow path.

5. The water purifier of claim 1, wherein at least one of the plurality of valve modules further includes an electronic valve module configured to open and close the plurality of openings by an electronic motor.

* * * * *